United States Patent [19]

Lorenz

[11] Patent Number: 4,686,140
[45] Date of Patent: Aug. 11, 1987

[54] WOOD VENEER PANELS BONDED WITH CELLULOSE SOLVENTS

[75] Inventor: Linda F. Lorenz, Middleton, Wis.

[73] Assignee: The United States of America as represented by the Secretary of the Agriculture, Washington, D.C.

[21] Appl. No.: 802,902

[22] Filed: Nov. 29, 1985

[51] Int. Cl.$^4$ .......................... B32B 21/06; B05D 3/04
[52] U.S. Cl. .................................... 428/342; 428/535; 428/537.1; 428/697; 156/305
[58] Field of Search ...................... 428/537.1, 342, 525, 428/697

[56] References Cited

U.S. PATENT DOCUMENTS

| | | | |
|---|---|---|---|
| 2,252,999 | 8/1941 | Wallach | 57/140 |
| 3,053,609 | 9/1962 | Miller | 8/128 |
| 3,063,454 | 11/1962 | Coates | 128/290 |
| 3,111,456 | 11/1963 | Hochman et al. | 428/537.1 |
| 3,389,037 | 6/1968 | Monfort | 156/305 |
| 4,082,884 | 4/1978 | DeLong | 428/537.1 |
| 4,453,997 | 6/1984 | Hori | 156/305 |
| 4,584,222 | 4/1986 | Iwamoto | 428/537.1 |

OTHER PUBLICATIONS

Chemical Abstracts, 102(8):63858f, "Bonding Wood Veneers With Cellulose Solvents", Dec. 1984, Conner et al.

Turbak, A. F.; "Recent Developments in Cellulose Solvent Systems"; Tappi, 67, pp. 94–96, 1984.

Gralen and Linderot; "The Nature and Physico-Chemical Properties of Solutions of Cellulose in Cupreous Solvents" Svensk Papperstidning 59, pp. 14–18, 1956.

Jamye and Verburg; "Uber ein Alkalisches Losungsmittel fur Cellulose", Reyon. Zellwelle Chemiefasern 32, p. 193, 1954.

Jayme and Verburg; "Uber ein Neues Alkalisches Losungsmittel fur Cellulose", Reyon. Zellwelle. Chemiefasern, 32, p. 275, 1954.

Jayme, G., "Investigation of Solutions", In *High Polymers*, vol V., Wiley Interscience, N.Y.; pp. 387–410, 1971.

Malm et al.; "Solubility of Cellulose in Iron–Sodium Tartrate Solution", Tappi, 44, pp. 102–108, 1961.

Browning, B. L., *Methods of Wood Chemistry*, vol. II, Wiley & Sons, N.Y., pp. 542–545, 1967.

Voluntary Product Standard PS 1-74, "Construction and Industrial Plywood", American National Standard A 199.1, 1974, National Bureau of Standards

*Primary Examiner*—P. C. Ives
*Attorney, Agent, or Firm*—M. Howard Silverstein; David G. McConnell

[57] ABSTRACT

Wood veneer panels bonded with cupriethylenediamine hydroxide and iron sodium tartrate, and methods of preparing same.

3 Claims, No Drawings

WOOD VENEER PANELS BONDED WITH CELLULOSE SOLVENTS

BACKGROUND OF THE INVENTION

Cellulose is one of the most abundant renewable organic materials in the world, yet, for all of its availability, cellulose has not yet reached its potential in many areas of application. One of the principle reasons is that, for most applications, natural cellulose is unsuitable.

Natural cellulose in the form of wood is a highly crystalline polymer of $\beta$-1,4-linked glucose units. It is insoluble in water and common organic solvents; nevertheless, for many applications of use, it is first necessary to dissolve it and then form it into the desired products from solution.

FIELD OF THE INVENTION

This invention relates to a novel method for bonding cellulose in the form of wood. More particularly, it relates to a method of dissolving cellulose on the surface of wood veneers, and utilizing the solvent-cellulosic dissolved material or complex as an adhesive to bond the veneers into panels of wood to be used for applications similar to those for interior-grade bonded-wood products now commercially available (i.e. interior grade plywood).

DESCRIPTION OF THE PRIOR ART

Various cellulose solvents have been used to dissolve cellulose and then form useful products by regenerating solid cellulose from the solution, as disclosed by A. F. Turbak, Tappi 67, 94–96 (1984).

From U.S. Pat. No. 2,252,999, it is known to make textiles by commingling before completion of spinning non-adhesive textile fibres and a minor proporation of at least one type of potentially adhesive fibre, spinning the commingled fibres into a single yarn, activating potentially adhesive fibres sufficiently to render them adhesive but not sufficiently to render the yarn formed therefrom non-porous, and compacting the fibres of the yarn while the fibres are in the adhesive condition so that they adhere to the non-adhesive fibre to provide a textile having increased tensile strength and resistance to wear and laundering.

The best known and most widely used cellulose solvents are those based on copper hydroxide[1] in aqueous solutions of either ammonia (cuprammonium hydroxide) or ethylenediamine (cupriethylenediamine hydroxide, often abbrev. cuene). By light absorption methods Gralen and Linderot[1] showed that in these solutions cellulose is dissolved as a cellulose-copper complex.

1. N. Gralen and J. Linderot, Svensk Paperstidn. 59, 14–18 (1956).

Jayme and Verburg[2] discovered that a ferric sodium tartrate complex in sodium hydroxide solution (generally referred to as FeTNa) possessed a high dissolving power for cellulose. FeTNa is a green complex formed in solution from $Fe(OH)_3$, tartaric acid, and NaOH in the molar ratio of 1:3:6.[3] The molar ratio of iron to tartrate in the FeTNa complex is varied from .1:1 to 1:4.5. The 1:3 molar FeTNa complex reacts with the C-2 and C-3 hydroxyl groups of cellulose to complete the unfilled glycol-binding sites of the 1:3 complex. Thus, the fibrous structure of cellulose is first loosened and then the cellulose polymer is brought into solution as a cellulose-FeTNa complex.

2. G. Jayme and W. Verburg, Reyon, Zellwolle, Chemiefasern 32, 193, 275 (1954).
3. G. Jayme, In High Polymers Vol. V, Wiley Interscience, N.Y., p. 381–410, 1971.

However, there is no known use of utilizing the dissolving capacity of cupriethylenediamine hydroxide (Cuene) and iron sodium tartrate (FeTNa) with cellulose to bond wood veneers into panels of ply.

SUMMARY OF THE INVENTION

Accordingly, one object of the invention is to provide a method for bonding wood veneers into panels of ply characterized by high dry shear strengths and relatively low or non-existent wet shear strengths.

Another object of the invention is the use of cupriethylenediamine hydroxide and iron sodium tartrate to function with dissolved cellulose as bonding agents for wood veneer.

Still another object of the invention is to produce panels of wood ply or laminates useful for interior-grade products (i.e. interior grade plywood), having a bond formed from Cupriethylenediamine hydroxide and iron sodium tartrate.

DETAILED DESCRIPTION OF THE INVENTION

It has been found that the cellulose solvents of cupriethylenediamine hydroxide and iron sodium tartrate have the ability to disrupt the crystalline structure of cellulose and then to dissolve the cellulose. Therefore, experiments were conducted to determine if these cellulose solvents could be used to bond wood panels. First, the cellulose solvent was applied to the surface of wood panels to disrupt the crystalline structure and dissolve the cellulose at the surface. The panels were then pressed to bring the two surfaces into intimate contact. Next, the panels were heated while pressing to remove the volatile components of the cellulose solvent, and it was found that apparently bonding occurred from crosslinking caused by a cellulose-metal complex or hydrogen bonds formed between the surfaces of the two wood panels or both.

The following examples, of Table 1, were conducted utilizing the cellulose solvents of the invention, and will demonstrate the conditions under which bonded wood veneer panels characterized by high dry shear strength and relatively weak or non-existent low wet shear strength are obtained.

TABLE 1

Shear Strengths for 2-Ply Yellow Birch Panels Bonded with Cellulose Solvents and Related Systems

| Bonding agent | Pressing time Min | Pressing temperature °C. | Shear Strength[a] Dry MPa (Psi) | Wet MPa (Psi) |
|---|---|---|---|---|
| Cuene | 2.5 | 125 | 4.6 ± 0.5 (657 ± 69) | 0.3 ± 0.3 (43 ± 41) |
| Cuene | 5.0 | 125 | 5.4 ± 0.3 (766 ± 50)[b] | 0.9 ± 0.1 (134 ± 18)[b] |
| Cuene | 7.5 | 125 | 8.3 ± 1.1 (1186 ± 150) | 0.9 ± 0.4 (129 ± 60) |
| Cuene | 10.0 | 125 | 12.0 ± 2.9 (1836 ± 419)[c] | 2.0 ± 0.4 (290 ± 62)[c] |
| Cuene | 5.0 | 160 | 6.6 ± 0.6 (935 ± 84) | 1.1 ± 0.4 (153 ± 49) |

TABLE 1-continued

Shear Strengths for 2-Ply Yellow Birch Panels Bonded with Cellulose Solvents and Related Systems

| Bonding agent | Pressing time Min | Pressing temperature °C. | Shear Strength[a] Dry MPa (Psi) | Wet MPa (Psi) |
|---|---|---|---|---|
| Cuene | 5.0 | 185 | 7.7 ± 1.1 (1095 ± 160) | 0 |
| Cuene | 16.0 h | 25 | 6.3 ± 0.1 (890 ± 19) | 0 |
| Cuene[d] | 7.5 | 125 | 3.3 ± 0.5 (462 ± 77) | 0 |
| Cuene[e] | 7.5 | 125 | 2.9 ± 0.8 (406 ± 109) | 0 |
| EDA[f] | 7.5 | 125 | 0.9 ± 1.3 (127 ± 179) | 0 |
| EDA + NH$_4$OH[g] | 7.5 | 125 | 1.3 ± 1.9 (188 ± 266) | 0 |
| FeTNa[h] | 7.5 | 125 | 5.6 ± 0.9 (792 ± 131) | 0 |
| Phenol-formaldehyde[i] | 5.0 | 150 | 13.7 ± 0.3 (1955 ± 49) | 8.3 ± 0.3 (1182 ± 39) |

[a]Shear strength ± s.e. (standard error) in all cases is the average of four lap shear specimens from one bonded panel except as noted.
[b]Shear strength ± s.e. is the average of four lap shear specimens from each of four bonded panels.
[c]Shear strength ± s.e. is the average of four lap shear specimens from each of two bonded panels.
[d]Cuene was allowed to dry for 20 min prior to assembling panel.
[e]Cuene was allowed to dry for 60 min prior to assembling panel.
[f]EDA = ethylenediamine. 0.8 ml of EDA was spread on the surface of each veneer used to form the 2-ply panel.
[g]0.8 ml EDA + 2.0 ml 30% NH$_4$OH was spread on the surface of each veneer used to form the 2-ply panel.
[h]6.0 ml FeTNa was spread on the surface of each veneer used to form the 2-ply panel.
[i]5 g of a commercial resin was spread on the surface of one veneer and used to form a 2-ply panel. Pressed at 1.23 MPa (175 Psi).

Table 1 shows the dry and wet shear strengths for 2-ply yellow birch panels bonded with cuene, FeTNa, and several other materials. The data indicates that fairly high dry shear strengths can be obtained; but that wet shear strengths are low and in some cases nonexistent. However, the data shows that the shear strengths of cuene bonded panels depend on the pressing temperature and pressing time. On pressing at 125° C. and 965 kPa (140 psi), both the dry and wet shear strengths of the cuene bonded panels increased with pressing time. On pressing at 965 kPa for 5 min over the temperature range of 125° to 185° C., the dry shear strengths of cuene bonded panels continued to increase with temperature. The wet shear strength under these pressing conditions also increased initially, but then declined over the interval from 160° to 185° C.

In experiments conducted for comparative purposes, 2-ply panels bonded with ethlenediamine (EDA) (known to swell cellulose) and with ethylenediamine containing an hydroxide other than cupric hydroxide had low dry shear strength but no wet shear strengths. Ethylenediamine bonded panels had low dry shear strength. Ethylenediamine in combination with ammonium hydroxide (EDA+NH$_4$OH) is clearly a poor bonding system.

A question arose as to whether water, cellulose solvent, heat and pressure would induce thermoplastic lignin bonding. As a consequence, control veneers coated with 7 ml of water or 7 ml of 2M EDA were pressed under conditions similar to the other panels but failed to bond. Therefore, it is unlikely that the bonds obtained with cuene are due to thermoplastic lignin bonding.

Panels bonded with cuene after the coated surfaces of the veneers are dried at ambient temperature for 20 and 60 min prior to pressing had diminished dry shear strength as compared with panels pressed immediately after coating with cuene, and had no wet strength. This is apparently due to the fact that cellulose "dissolved" by the cuene at the wood surface did not remain dissolved as the volatile components in the cuene evaporated. Therefore, it is believed that these conditions limited the formation of crosslinks between the wood panels on pressing.

Birch panels bonded with FeTNa at 125° C. and 965 kPa for 7.5 min gave dry shear strengths comparable to those for cuene panels bonded at 125° C., 965 kPa for 5 min; however, no wet shear strength was observed.

In cuene and FeTNa bonded panels, failure of all shear specimens occurred in the bond line, and dry shear strength of the best bonded specimens was equal to 95% of that obtained with a commercial phenol-formaldehyde and tested under the same conditions.

Bonding with the cellulose solvents of cuene and FeTNa produce wood panels with substantial dry shear strengths and minimal or non-existent wet shear strengths, and it is presumed that the bonding occurs via a cellulose-metal complex formed between the "solubilized" cellulose at the surfaces of the wood panels or via hydrogen bonds formed between the bonded surfaces or both.

Since the molar range of cuene is not critical, cuene will suffice; however, in the most preferred embodiment, the cuene cellulose solvent will constitute about 2M in ethylenediamine and 1M in copper. The iron sodium tartrate (FeTNa) cellulose solvent was prepared by the method of Malm et al[4]. as described by Browning[5].

4. C. J. Malm, R. E. Glegg, and M. Luce, Tappi 44, 102 (1961).
5. B. L. Browning, Methods of Wood Chemistry Vol. II, Wiley & Sons, N.Y., 1967

In the example of Table 1, rotary cut yellow birch veneer (3 mm thick) was conditioned to equilibrium moisture content at 27° C. and 30% relative humidity, and pieces 150×150 mm$^2$ were cut and bonded into panels.

Approximately 7 g of the cellulose solvent or other bonding system was spread as evenly as possible with a spatula on one side of each piece. Two pieces were immediately assembled into a panel so that the grain in both plies was parallel. The panel was then placed into a heated press and pressed at 965 kPa (140 psi) for various times and temperatures.

In determining the shear strength, each panel was conditioned at 27° C., 30% relative humidity for approximately 1 to 2 weeks before cutting into 12 2-ply lap shear specimens. Four specimens from each panel were tested for dry shear strength using a universal testing machine at a loading rate of 1 cm/min. Another four specimens from each panel were subjected to a standard vacuum-pressure soak[6]. A vacuum of 85 kPa (25 in. of mercury) was drawn on the specimens while in water and held for 30 minutes. The vacuum was broken and a pressure of 450 to 480 kPa (65–70 psi) was applied to the specimen still in water and held for 30 minutes. Then, the shear strength was determined on the wet specimens.

[6]. National Bureau of Standards, U.S. Product Standard, PS 1-74 for Construction Plywood, 1974.

While the method of bonding of the invention has been described in detail with reference to specific embodiments using yellow birch, it will be apparent to those skilled in the art that, due to the chemical similarity of cellulose in woods, the process is applicable to all woods, and that different woods can be used in place of the yellow birch without departing from the spirit and scope of the invention.

What is claimed is:

1. A bonded wood veneer panel of (ply) plies characterized by high dry shear strengths comprising at least 2 ply of veneer (having a bond comprising cellulose solvents) bonded with an adhesive selected from the group consisting of (aqueous solutions of) a cupriethylenediamine hydroxide-cellulosic complex and an iron sodium tartrate-cellulosic complex, wherein the bond is formed by heating said panel under pressure.

2. The bonded wood veneer panel of claim 1, wherein the ply is yellow birch.

3. The bonded wood veneer panel of claim 2 wherein said cupriethylenediamine hydroxide and iron sodium tartrate components of said adhesives are present in amounts of from about 100 to 500 g/square meters.

* * * * *

UNITED STATES PATENT AND TRADEMARK OFFICE
CERTIFICATE OF CORRECTION

PATENT NO. : 4,686,140
DATED : August 11, 1987
INVENTOR(S) : Anthony H. Conner, Bryan H. River and Linda F. Lorenz It is certified that error appears in the above—identified patent and that said Letters Patent is hereby corrected as shown below:

ON THE TITLE PAGE:

In the Inventor Identification, before "Linda F. Lorenz, Middleton, Wis." insert the following two inventors:
--Anthony H. Conner, Madison, Wis.
 Bryan H. River, Verona, Wis.--

Signed and Sealed this

Sixteenth Day of February, 1988

Attest:

DONALD J. QUIGG

*Attesting Officer*

*Commissioner of Patents and Trademarks*

UNITED STATES PATENT AND TRADEMARK OFFICE
CERTIFICATE OF CORRECTION

PATENT NO. : 4,686,140

DATED : August 11, 1987

INVENTOR(S) : Anthony H. Conner, Bryan H. River and Linda F. Lorenz

It is certified that error appears in the above-identified patent and that said Letters Patent is hereby corrected as shown below:

Column 1: line 9, change "principle" to --principal--; line 36, change "proporation" to --proportion--.
    Column 3: line 42, change "ethlenediamine" to --ethylenediamine--.
    Column 4: line 52, change "equalibrium" to --equilibrium--.
    Column 5: line 6, change "specimen" to --specimens--.
    Claim 1: line 1, delete "(ply)"; lines 3 and 4, delete "(having a bond comprising cellulose solvents)"; line 5, delete "(aqueous solutions of)".

Signed and Sealed this

Fourteenth Day of March, 1989

Attest:

DONALD J. QUIGG

*Attesting Officer*

*Commissioner of Patents and Trademarks*